US012129956B2

(12) United States Patent
Lenihan

(10) Patent No.: US 12,129,956 B2
(45) Date of Patent: Oct. 29, 2024

(54) L-BRACKET

(71) Applicant: 3 LEGGED THING LIMITED, Bedfordshire (GB)

(72) Inventor: Danny Lenihan, Bedfordshire (GB)

(73) Assignee: 3 LEGGED THING LIMITED, Bedfordshire (GB)

( * ) Notice: Subject to any disclaimer, the term of this patent is extended or adjusted under 35 U.S.C. 154(b) by 246 days.

(21) Appl. No.: 17/614,220

(22) PCT Filed: May 29, 2020

(86) PCT No.: PCT/GB2020/051312
§ 371 (c)(1),
(2) Date: Nov. 24, 2021

(87) PCT Pub. No.: WO2020/240205
PCT Pub. Date: Dec. 3, 2020

(65) Prior Publication Data
US 2022/0214007 A1 Jul. 7, 2022

(30) Foreign Application Priority Data
May 29, 2019 (GB) ...................... 1907611

(51) Int. Cl.
*F16M 11/04* (2006.01)
*A45F 5/00* (2006.01)
(Continued)

(52) U.S. Cl.
CPC ............. *F16M 11/041* (2013.01); *A45F 5/00* (2013.01); *F16M 13/04* (2013.01);
(Continued)

(58) Field of Classification Search
CPC ......... F16M 11/041; F16M 13/04; A45F 5/00; A45F 2005/006; A45F 2200/0533; G03B 17/561
See application file for complete search history.

(56) References Cited

U.S. PATENT DOCUMENTS 6,196,504 B1 * 3/2001 Lemke ................ F16M 11/041
396/428
7,980,771 B2 * 7/2011 Chamberlayne ..... G03B 17/561
396/423
(Continued)

FOREIGN PATENT DOCUMENTS

| KR | 20180001550 | | 5/2018 |
| KR | 20180001550 U | * | 5/2018 |
| WO | 2009/039292 A1 | | 3/2009 |

OTHER PUBLICATIONS

Leofoto LPC-R5 L-plate sold on amazon.com dated Jul. 31, 2012, https://www.amazon.com/LEOFOTO-LPC-R5-Dedicated-Camera-Compatible/dp/B08LR2H6N2 (Year: 2012).*

(Continued)

*Primary Examiner* — Eret C McNichols
*Assistant Examiner* — Ding Y Tan
(74) *Attorney, Agent, or Firm* — Andrus Property Law, LLP

(57) ABSTRACT

There is provided an L-bracket for a camera. The L-bracket comprises a base, an upright arm connected to the base and a fastening element arranged in use to provide a releasable connection between the camera and the L-bracket; and a connector attached to one of the base or the arm, the connector being arranged in use to engage a dock mountable on a strap, the connector being shaped to engage the dock in multiple orientations.

20 Claims, 10 Drawing Sheets

(51) Int. Cl.
*F16M 13/04* (2006.01)
*G03B 17/56* (2021.01)

(52) U.S. Cl.
CPC ...... *G03B 17/561* (2013.01); *A45F 2005/006* (2013.01); *A45F 2200/0533* (2013.01)

(56) References Cited

U.S. PATENT DOCUMENTS

| | | | | |
|---|---|---|---|---|
| 8,662,763 | B2* | 3/2014 | Vogt | F16M 11/041 |
| | | | | 396/428 |
| 8,827,574 | B2* | 9/2014 | Johnson | H01G 9/025 |
| | | | | 396/419 |
| 9,280,039 | B2 | 3/2016 | Johnson, Sr. et al. | |
| 10,437,138 | B1* | 10/2019 | Fudala | G03B 17/561 |
| 10,782,596 | B2* | 9/2020 | Wilson | F16M 11/08 |
| 11,092,882 | B2* | 8/2021 | Fliger | F16M 11/04 |
| D967,244 | S* | 10/2022 | Matthews | D16/245 |
| 2011/0243544 | A1 | 10/2011 | Chamberlayne | |
| 2012/0106944 | A1 | 5/2012 | Johnson | |
| 2013/0302023 | A1* | 11/2013 | Chamberlayne | G03B 17/563 |
| | | | | 396/423 |
| 2014/0099093 | A1* | 4/2014 | Johnson, Sr. | F16M 13/022 |
| | | | | 396/428 |
| 2015/0261074 | A1* | 9/2015 | Johnson, Sr. | F16M 11/2078 |
| | | | | 396/428 |
| 2015/0286116 | A1* | 10/2015 | Johnson, Sr. | F16M 11/14 |
| | | | | 348/373 |
| 2019/0113827 | A1* | 4/2019 | Fliger | G03B 17/561 |
| 2019/0271902 | A1* | 9/2019 | Chan | F16M 11/041 |
| 2020/0133103 | A1* | 4/2020 | Johnson, Sr. | F16M 11/105 |
| 2020/0218139 | A1* | 7/2020 | Tiefenbrunn | F16B 2/12 |
| 2021/0011359 | A1* | 1/2021 | Johnson, Sr. | G03B 17/561 |

OTHER PUBLICATIONS

Dan Carr online article "3 big reasons you should be using an L-plate on your camera" dated Jan. 12, 2018 on shutter muse (Year: 2018).*
Dan Carr online article "The Ultimate Guide to Choosing and Using an L-Plate on Your Camera" dated Dec. 12, 2017 on shutter muse (Year: 2017).*
Movo NSA-1 universal swivel tripod mount and camera strap adapter sold on amazon dated Jul. 27, 2016, https://www.amazon.com/Movo-NSA-1-Universal-Connector-Camcorders/dp/B01J6QBQ60 (Year: 2016).*
Arca Swiss mini L-bracket with quick release assembly https://web.archive.org dated Mar. 11, 2015, https://www.adorama.com/awmlb.html (Year: 2015).*
Gordy's camera straps, archive.org/ dated May 3, 2019 https://gordyscamerastraps.com/ (Year: 2019).*
Search and Examination Report dated Feb. 13, 2023 issued in corresponding application CN2020800400811.
Search and Examination Report dated Nov. 12, 2019 issued in corresponding GB Appln. No. 1907611.6.
International Search Report and Written Opinion in corresponding PCT/GB2020/051312, dated Jul. 28, 2020.
Search Report dated Jul. 29, 2021 issued in corresponding GB Appln. No. 1907611.65.
Youtube.com, "3 Legged Thing Ellie Universal L-Bracket," https://www.youtube.com/watch?v=gplzVAVSKzs.

* cited by examiner

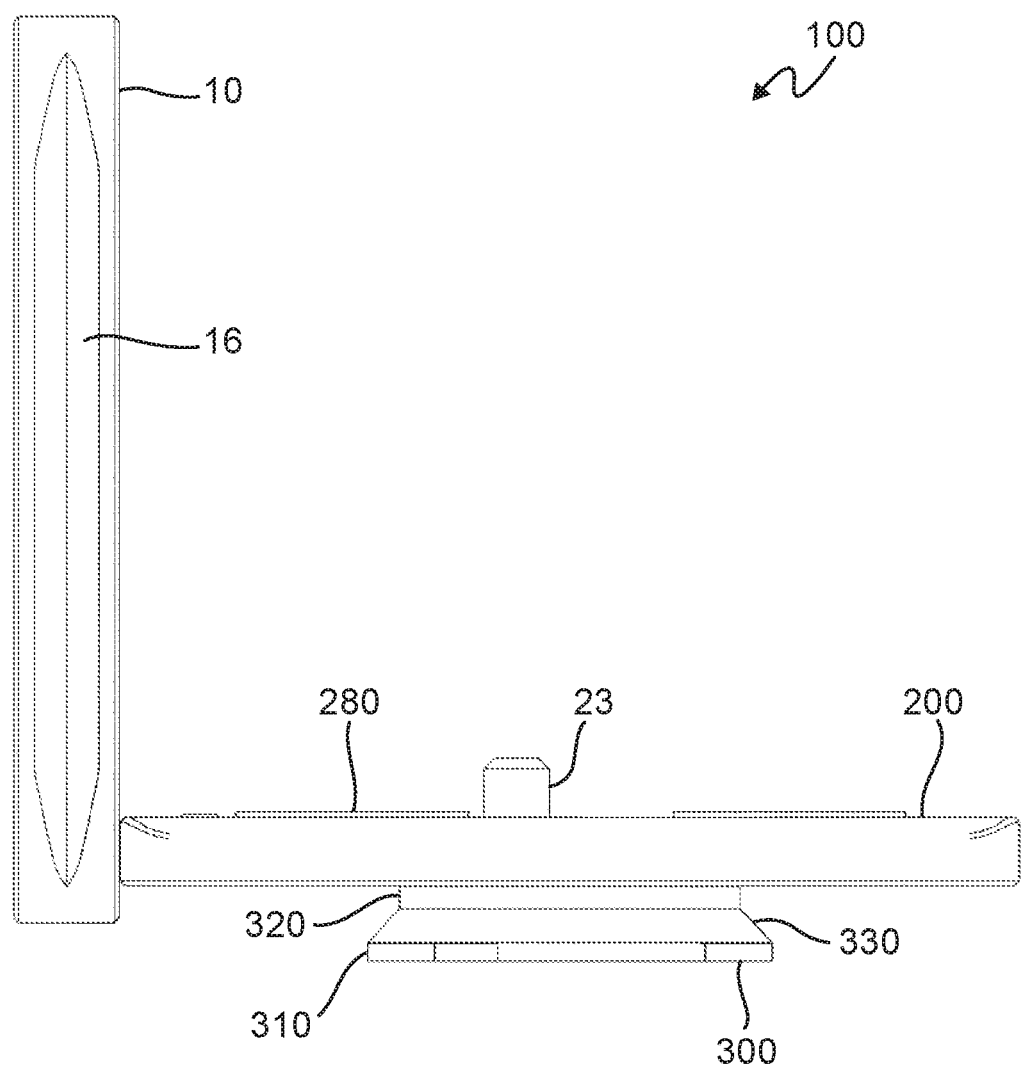

L-BRACKET

CROSS-REFERENCE TO RELATED APPLICATIONS

This application is the U.S. national stage application of International Application No. PCT/GB2020/051312, filed May 29, 2020, which international application was published on Dec. 3, 2020, as International Publication No. WO/2020/240205 in the English language. The International Application claims priority of United Kingdom Patent Application No. 1907611.6, filed May 29, 2019.

The present invention relates to a mounting assembly for mounting a device to a support. This is typically in the form of an L-bracket and is typically expected to be used with cameras, such as photographic cameras.

Photographers and cinematographers commonly mount cameras and other photographic and cinematic devices on supports such as tripods and monopods. While such supports are typically provided with a swivel or joint element to allow the device to be configured between different orientations, such as landscape or portrait, moving between the orientations can be cumbersome and can often shift the centre of gravity of the device resulting in a loss of stability.

L-brackets, which allow an easy and controlled configuration of a photographic device between different orientations on the support, have become increasingly popular with consumers. They also retain the camera sensor position, which in turn retains the focal plane, which is the signature attribute of an L-Bracket. An L-bracket is a mounting assembly which consists of a base potion and an arm portion positioned at a right angle to the base portion to provide the "L" shape that gives the bracket its name. Each of the base portion and the arm portion typically has a means for connecting to a support, which typically includes a quick-release engagement means which is able to co-operate with a complementary engagement element on the support for easy attachment and detachment. The camera, or other photographic device, is securely mounted on the base portion of the L-bracket such that the arm portion extends parallel to a side of the device. Usually, a face of the arm portion also abuts the side of the device. The L-bracket can then be mounted on the support via either one of the base or arm portions. Using the quick-release engagement of the L-bracket, a user can easily switch between a first configuration in which the device is secured on the support at a first (e.g. landscape) orientation, and a second configuration in which the device is secured on the support at a second (e.g. portrait) orientation.

Photographers often want quick access to their camera and carry multiple cameras with them when taking photographs. The desired speed of access is not typically achievable by storing a camera in a bag. This extends to the use of multiple cameras, where space in a bag, or the size of a bag, may become prohibitive to free movement of a photographer to allow them to position themselves as they wish to take a photograph.

To address these desires a range of products have been developed to achieve suitable access to cameras and to allow multiple cameras to be carried without over-encumbering a photographer. Such products include the Peak Design Capture Clip and the Spider Camera Holster. These allow one or more cameras to be attached to a belt, bag or strap being worn by a photographer to enable the photographer to be "hands free" when the camera is not in use, without the need to stow away the camera to avoid it getting in the way, while also holding the one or more cameras securely to avoid a camera being damaged or misplaced.

There are times when a photographer wants quick access to their camera and to carry multiple cameras while also wanting to allow easy and controlled configuration of a camera between different orientations when mechanically supported, such as by a tripod. However, clip and holster style products are incompatible with L-brackets and other photographic accessories. This is due to the difference in the intended use of the clip and holster style products, namely a hand support, fast reaction photographic style, such as street photography or fashion photography, compared to a more methodical and structured photographic style, such as still life or long exposure photography, for L-brackets.

The present invention seeks to address at least some of the above problems.

SUMMARY OF THE INVENTION

According to a first aspect there is provided an L-bracket for a camera, comprising: a base, an upright arm connected to the base and a fastening element arranged in use to provide a releasable connection between the camera and the L-bracket; and a connector attached to one of the base or the arm, the connector being arranged in use to engage a dock mountable on a strap, the connector having a foot section with a surface shaped to engage the dock, wherein the foot has a cross-section having at least two lines of symmetry to allow the connector to engage the dock in multiple orientations.

This provides an L-bracket that is also able to be used to connect to a clip or holster style product. This increases the flexibility the photographer has with their camera due to the ability to carry one or more cameras attached to the L-bracket of the first aspect on a strap worn by the photographer, providing them with quick access to the camera. This is achieved while also allowing a camera to be kept close to hand and safe while a tripod or similar product is being set up. This is not achievable with conventional L-brackets because conventional L-brackets are designed only to fit into a mount on a tripod, such as opposing jaws of an Arca-Swiss style mount, which cannot be linked to a holster style product. The shape of the connector allowing the dock to be engaged in multiple orientations also allows the user to easily engage the bracket with the dock due to the reduced amount of alignment the user needs to achieve to allow docking. This makes the product simple to use.

The surface of the foot section may be only a single surface or may be at least one surface, such as a plurality of surfaces, including two surfaces, three, four, five, six or more surfaces. Typically the surface of the foot section may be defined by at least two sides shaped to engage the dock. This allows for the user to select the orientation of with which the dock is able to be engaged and for that orientation to remain fixed once the L-bracket is engaged with the dock.

The phrase "multiple orientations" is intended to mean more orientations than a single position and its mirror image, such as the positions of a conventional L-bracket being connected to a tripod mount by a pair of jaws on the tripod with the upright arm of the L-bracket being located to the left of the jaws when viewed from one position and then released and switched to being connected to the tripod by the jaws with the arm being located to the right of the jaws when viewed from the same position. Generally, this is considered as a single orientation. However, should this be considered to be two orientations, the phrase "multiple orientations" could mean more than two orientations, such as three of more orientations. For example, in this interpretation, typically, the connector is shaped to engage the dock in three or more orientations.

The L-bracket may be a type of mounting assembly.

The connector may be movable relative to whichever of the base or arm the connector is attached to. However typically, the orientation of the connector is fixed relative to the base when attached to the base or to the arm when connected to the arm. This allows for the L-bracket to be engaged with the dock by a repeatable movement. The user is therefore able to become familiar with the movement used to engage the bracket with the dock. This repeatable movement makes the bracket easier to use by the user and avoids the need for the user to have to re-configure the bracket to a configuration with which they are familiar for use with a dock.

The location of the connector may be able to be changed. Typically however, the connector has a fixed location relative to the base when attached to the base or to the arm when attached to the arm. As with a fixed orientation, this makes it easier for a user to attachment the bracket to the dock. This is due to the consistent location of the connector allowing the user to become familiar with location of connector for docking instead of needing to check the connector location each time they wish to attach the bracket to the dock. Such a fixed location and/or orientation can allow a user to engage and disengage the bracket with the dock without looking at the bracket or dock once they become familiar with the bracket, which would not be as easily achievable, or achievable at all, if the connector location and/or orientation were not consistent due to an ability to move the connector. This is even the case should a fixed location and/or orientation potentially being initially viewed as an undesirable feature by a user due to the limit this places on the flexibility of the bracket when being used with a tripod, which is its original, and therefore primary, purpose for a photographer. This is because the ability of move the bracket relative to the tripod, which is often desirable when using an L-bracket would be limited when the tripod is engaged with the connector.

The fastening element may be positioned in a fixed location relative to the connector location, though typically, the fastening element is movable relative to the location of connector. This allows for different camera shapes and sizes to be used with the bracket while allowing whatever camera is used to be held in the desired position when mounted to a tripod using the bracket.

The fastening element may be engagable with the base and with a camera to provide the connection between the connection between the camera and the L-bracket in use. This is as an alternative or in addition to the fastening element being engagable with the arm and with a camera to provide a similar connection in use. Such a connection provides a releasable join between a camera and the bracket.

The arm may be a plate having a C-shape provided by an aperture in the plate, the arm thereby having an opening in a side. This allows a cable with a right-angle connector to be connected to a camera mounted on the L-bracket while the camera is mounted to the bracket.

Additionally, the arm may have a plurality of attachment elements arranged, in use, to attach the arm to the base plate, the position of the opening in the arm causing the opening to have a different position relative to the base plate when the arm is connected to the base plate by each respective attachment element.

By having an opening and a plurality of attachment elements arranged to attach the arm to the base plate, it is possible to provide a mounting assembly having an opening in the arm portion in which the position of the opening with respect to the base plate can be easily varied. The opening in the arm portion provides, in use, access to the device even when the device is fully mounted on the mounting assembly. By changing the position at which the arm is connected to the base plate, the user can easily configure the mounting assembly to suit the dimensions of the device to which it is applied. The first aspect thereby provides a versatile mounting assembly which can be adjusted for use with many different devices, while providing the functionality of a stable and reliable mounting to a support.

The base and arm may be orientated at a right angle relative to each other. Such a configuration allows the mounting assembly to function as an L-bracket, while providing the versatility of being adjustable for the device to which the mounting assembly is applied.

Whilst the arm may have attachment elements arranged in any position, typically the arm may have opposing ends, the opening being between the opposing ends, and each end may have at least one attachment element.

The distance between attachment elements at the ends of the arm and the relative location of the opening in relation to the ends allows a greater variation in the location at which the arm can be attached to the base. By allowing a greater variation in the connection between the arm and the base, it is possible to provide a wide range of positions to which the opening in the arm can be configured. The positioning of attachment elements at the ends of the arm also allows the attachment elements not to interfere with the main body of the arm, such that the aperture can be made as large as possible to provide increased access to the device in use.

Typically, the arm may have a front face and a rear face (in addition to the arm having sides for example). Additionally each face may have at least one attachment element. By each face of the arm having an attachment element, the versatility is improved by providing a greater number of positions in which the opening of the arm is able to be placed. Further the attachment elements may be in corresponding positions on each face. This makes it possible to ensure that the load experienced due to attachment with the base is consistent. Furthermore, if the attachment elements at similar or corresponding positions on each face, as is an option, significantly simplifies manufacture of the arm.

The L-bracket may further comprise a first securing element, the first securing element providing a connection between the arm and the base.

Each attachment element may comprise one or more bores. Furthermore, each of the bores may be arranged, in use, to engage a first securing element engagable with the base. Mounting equipment such as the L-bracket of the first aspect is often used to mount delicate and often very expensive, devices to a support. It is important therefore that any connection between parts is rigid and stable. By having bores arranged to accept and engage a securing element, it is possible to ensure a tight connection between the arm and the base.

The first securing element may be movable to allow the distance between the arm and the base to be adjusted in use. For example, the first securing element may be slidable relative to the base.

The first securing element may comprise a rail. At least a portion of the rail may have a threaded surface. To co-operate with the threaded surface of the rail, the bores may be threaded bores or have a threaded portion. A threaded connection, such as that provided by a screw, ensures tight and durable attachment of the first securing element to the attachment means.

Each of the bores may be through-bores. When the first securing element is longer than the bore, this allows the length of a projecting part of the first securing element to be adjusted and further allows the first securing element to be accessed and adjusted from either side of the connection. Of course, it would be possible for each bore to be a blind-bore or for there to be a combination of through-bores and blind-bores.

Each of the through-bores may be distinct and spaced apart from each other. However, to provide additional functionality, typically the through-bores of each attachment means may be joined by one or more slots extending between the through-bores. For example, the slots may be used to clip or attach additional components to the mounting assembly. In some examples, the slots may themselves be through-slots, extending between the front and rear faces of the arm. In such a case, the through-slots can provide a further functionality as a loop for a camera strap, for example. Another advantage of slots between the bores is that this reduces the weight of the mounting assembly.

The connector on the base may comprise any element suitable to accept and removably engage a device. Typically, the connector may comprise a connector bore, and the connector bore may be arranged, in use, to engage a second securing element. A connector bore can provide a secure and stable connection between the device and the base, allowing for co-operation with a second securing element. The use of a connector bore as a connector is also advantageous in that it allows a device with an in-built connector, for example, a clip or a push-fit element to be connected to the base. As with the bores of the attachment means, the connector bore may be a through-bore, and may be at least partially threaded. The second securing element may be a rail or a bolt, and at least a portion of the second securing element may be threaded. To provide further flexibility, the attachment means of the arm may also be arranged to engage, in use, with the second securing element.

The base may comprise one or more bores arranged, in use, to engage with a first securing element to secure the base to the attachment means of the arm. By having bores arranged to engage with the first securing element, it is possible to reliably secure the arm to the base through the first securing element. In addition to, as an alternative to, the bores, the base may further comprise grooves or recesses arranged to receive and/or guide the first securing element. The grooves or recesses may be separate from, or continuous with, the bores of the base.

The first securing element may be slidable relative to the base. A sliding arrangement allows the connection between the arm and the base to be easily and precisely adjusted. For example, such an arrangement allows a user to easily adjust the mounting assembly to suit the dimensions of different devices.

The first securing element may be held in position in the bores of the base by a locking member.

In order to ensure a sturdy connection between the base and the arm, the first securing element typically is held in position in the bores of the base. The base may further comprise a locking member to lock the first securing element in position. The base may comprise one or more locking members, each arranged to lock one or more first securing elements in position. In the case that the first securing element is slidable relative to the base, once the user has adjusted and selected a configuration of the first securing element, the user may lock the base and arm in position by using the one or locking members.

It is important that the locking member is able to engage and maintain a secure hold of the first securing elements. Typically, the locking member may comprise one or more locking screws each arranged to engage one or more first securing elements. Alternatively, the locking member may comprise a clamp or a jaw arranged to grip the one or more first securing elements.

An important feature of the mounting assembly is the ability to mount the device to the support at two or more different orientations. To achieve this, the mounting assembly may be mounted to the support at either the base or the arm. The arm may comprise an engagement means for engagement with the support to achieve this.

The engagement means (either on the arm or on the base) may be arranged to co-operate with a corresponding member on the support. For example, the engagement means may comprise one or more grooves arranged to cooperate with a jaw on the support. The engagement on one or both of the arm and the base may comprise a pair of grooves on opposing sides of the arm and base respectively. In a case where the mounting assembly is secured and gripped by a clamp or a jaw on the support, having a pair of grooves on opposing sides allows a strong and even application of force from the clamp or jaw. The grooves may be separate and attached to one or both of the base and the arm. Alternatively, the grooves may be integrally formed with one or both of the base and the arm.

The grooves of the engagement means may be dovetail grooves, meaning that at least a portion of the groove's cross section has a trapezoidal or triangular shape, and the groove is arranged to cooperate with a rail or jaw having a complementary shape to form a "dovetail joint". Dovetail joints provide a secure engagement, and have a high resistance to being pulled apart. This ensures improved stability. Furthermore, such an arrangement allows the engagement means of the base or arm to be easily slid in to a complementary member on the support, improving ergonomics. A further advantage of the use of dovetail grooves is that many support products use dovetail jaws to provide what is known as a "Quick-Release (QR)" mechanism to facilitate rapid attachment and detachment of devices to the support. By using dovetail grooves, the mounting assembly provides compatibility with many supports, further improving versatility of the mounting assembly. For example, the engagement means may take the form of an Arca-Swiss style connection that is arrange in use to connect with a clamp or support with an Arca-Swiss style jaw arrangement.

The base may typically comprise an upper surface and a lower surface, the upper surface being arranged to receive, in use, the device to be mounted on the mounting assembly.

Many photographic devices have parts which have the ability to extend out of its main volume. For example, some modern cameras are provided with a "flip" screen. Such a screen typically has the capability of being flipped and pulled to extend out of the camera. To accommodate for, and provide access to, parts of the device extending outward, at least one edge of the upper surface of the base may comprise a downward chamfer.

As it will be appreciated, many of the parts of the L-bracket described above may be modular and removable. As such, according to a second aspect, there is provided a kit of parts for an L-bracket to the first aspect, the kit comprising: a base; an upright arm connectable to the base; a fastening element arranged in use to provide a releasable connection between a camera and the L-bracket; and a connector attached to one of the base or the arm, the connector being arranged in use to engage a dock mountable on a strap, the connector having a foot section with a surface shaped to engage the dock, wherein the foot has a cross-section having at least two lines of symmetry to allow the connector to engage the dock in multiple orientations.

According to a third aspect, there is provided an L-bracket for a camera, comprising: a base, an upright arm connected to the base and a fastening element arranged in use to provide a releasable connection between the camera and the L-bracket; and a connector attached to one of the base or the arm, the connector being arranged in use to engage a dock mountable on a strap, the connector being shaped to engage the dock in multiple orientations. The L-bracket of the third aspect may of course use any combination of features set out above as relating to the first aspect and apply these features correspondingly in respect of the third aspect.

BRIEF DESCRIPTION OF THE DRAWINGS

Example L-brackets will now be described with reference to the accompanying drawings, in which:

FIG. 6 schematically illustrates a further example L-bracket;

DETAILED DESCRIPTION

Figure 1:
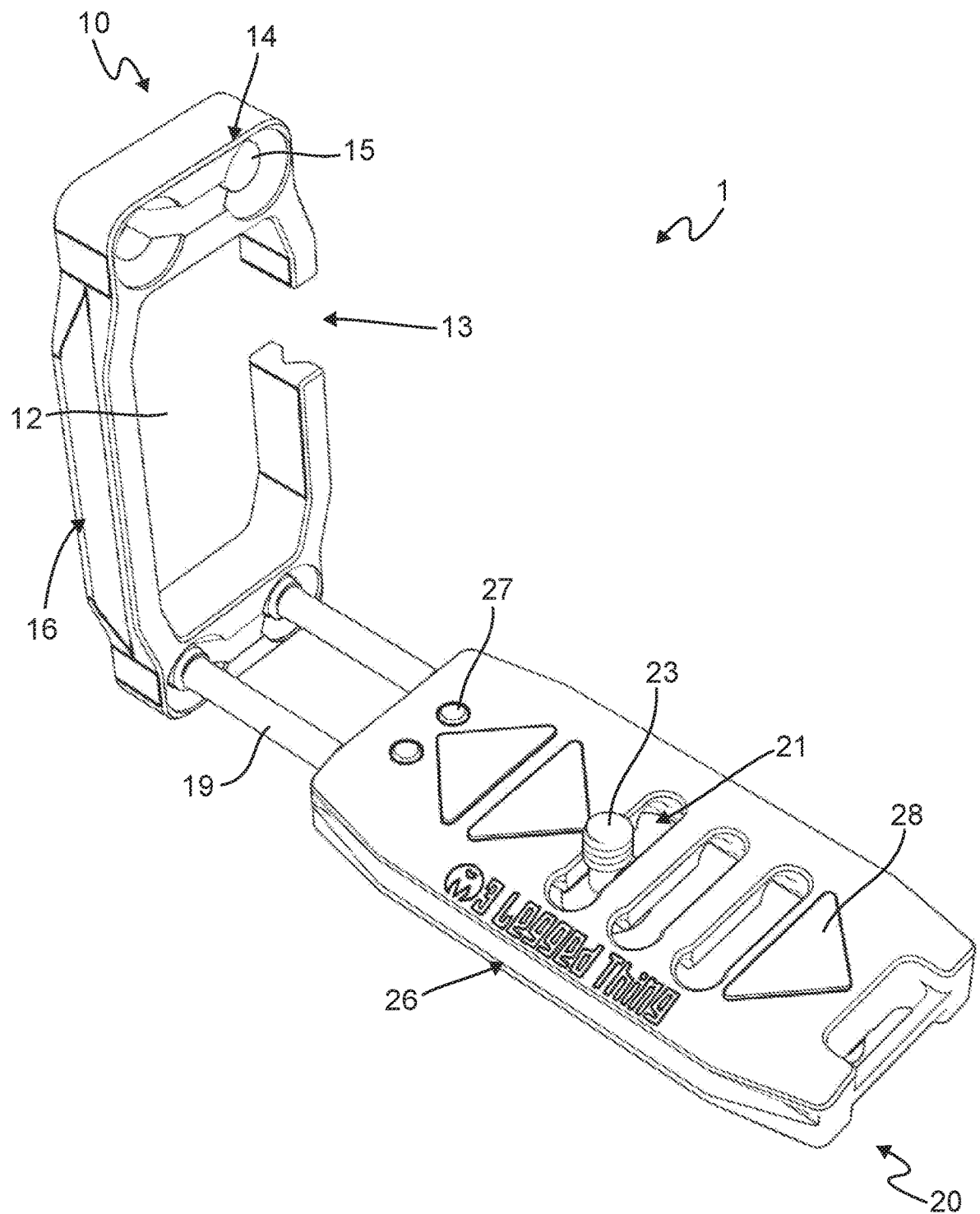
FIG. 1 schematically illustrates an example L-bracket in an assembled configuration.

An example mounting assembly (in the form of an L-bracket) 1 is generally illustrated in an assembled configuration in FIG. 1. The mounting assembly 1 comprises an arm 10 and a base 20 (also referred to herein as a "base plate" due to the base being provided by a plate in the examples described).

The mounting assembly 1 arranged to receive a device, such as a camera or other photographic or cinematic equipment, at either one of the arm 10 or the base plate 20.

The arm 10 comprises a plate 11 having an aperture 12 therethrough. The aperture 12 is provided on the arm 10 so as to form an opening 13 in a side, such that the arm 10 is substantially C-shaped. By C-shaped, we mean a shape having the shape of a capital letter "C". For example, such a shape takes the form of a quadrilateral having a break, or a gap, at one of its sides, as is shown in the configuration illustrated in FIG. 1. In other examples, a "C-shape" may alternatively take the form of any other polygon or ellipse having a break or a gap on one of its sides.

In this example, the C-shaped arm 10 generally has two pairs of opposing sides: two opposing longitudinal sides, and two opposing lateral sides, the longitudinal sides being longer than the lateral sides. This forms a generally rectangular shape. The opening 13 is provided on one of the longitudinal sides, at a position closer to one of the two lateral sides than the other lateral side. In other examples, the opening 13 can be provided at a position which is equidistant from the pair of lateral sides. The opening 13 may also be provided at one of the lateral sides, rather than at a longitudinal side. In other examples, the lateral and longitudinal sides may have the same length thereby forming a generally square shape.

In addition to the two pairs of opposing sides, the arm 10 has two faces. These are separated by the sides of the arm, which provide the arm with its thickness.

Figure 2A:
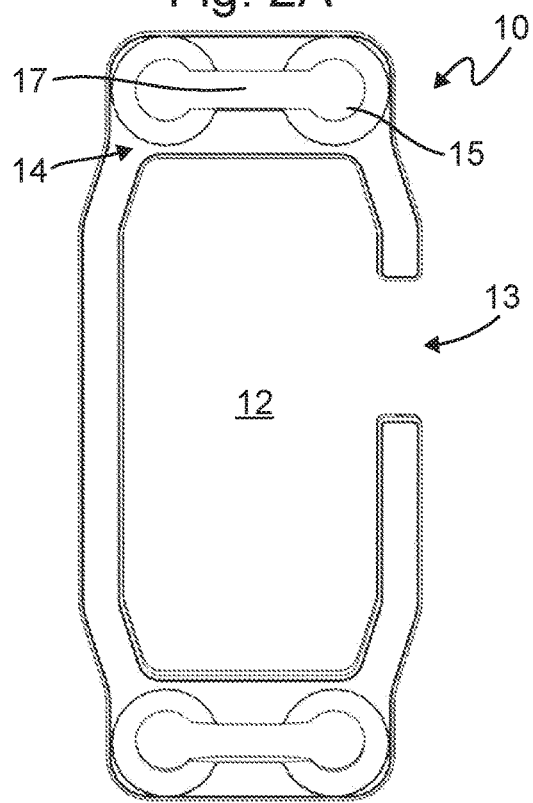
FIG. 2A schematically illustrates an example configuration of an arm of the L-bracket of FIG. 1.
Figure 2B:
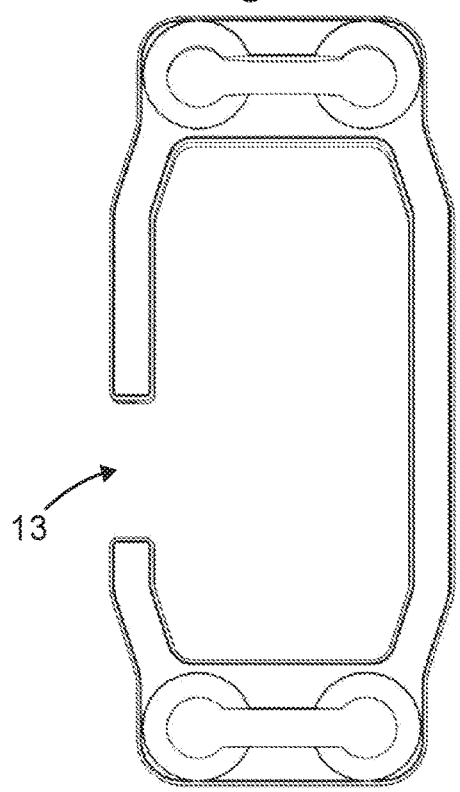
FIG. 2B schematically illustrates another example configuration of an arm of the L-bracket of FIG. 1.
Figure 2C:
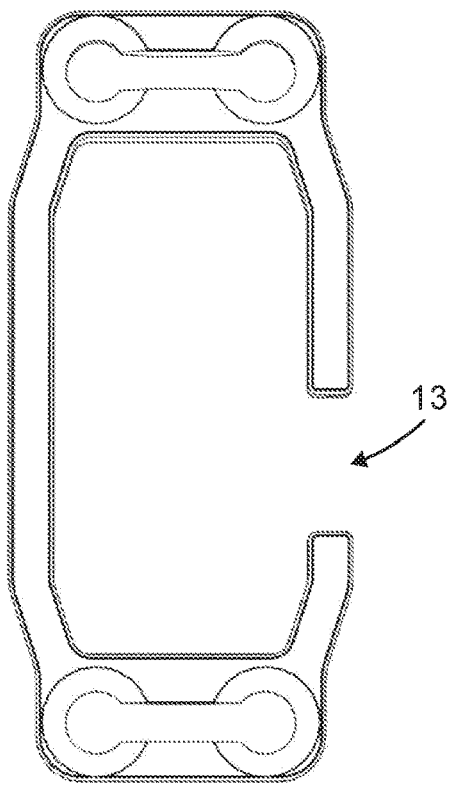
FIG. 2C schematically illustrates another example configuration of an arm of the L-bracket of FIG. 1.
Figure 2D:
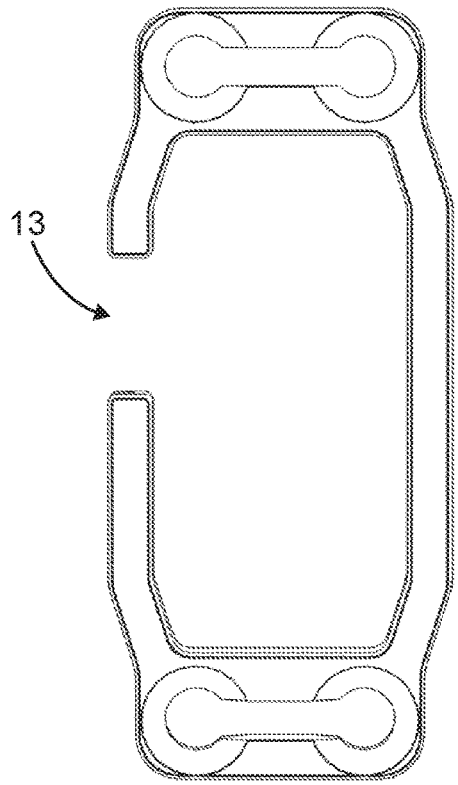
FIG. 2D schematically illustrates another example configuration of an arm of the L-bracket of FIG. 1.

FIGS. 2A through 2D illustrate how the arm 10 can be configured to "move" the position of the opening 13. FIG. 2A shows the arm 10 having the opening in a first position (in this example in an upper right quadrant of the arm). The arm 10 of FIG. 2A can be rotated through 180 degrees in the plane of the arm 10, as illustrated in FIG. 2B, to reposition the opening 13 apparently on an opposite longitudinal side to the arm 10 of FIG. 2A (so in this example in a lower left quadrant of the arm). Furthermore, the arm 10 of FIG. 2B can be rotated 180 about its longitudinal axis, to further reposition opening 13. Such a position is shown in FIG. 2C. This results in the opening being located in a lower right quadrant of the arm in this example. The rotated arm of FIG. 2C can then be rotated 180 degrees again in the plane of the arm to provide still another position for the opening 13. This is shown in FIG. 2D, which shows an example with the opening in an upper left quadrant of the arm. Due to the asymmetry of the arm 10, each one of the configurations shown in FIGS. 2A through 2D provides the opening 13 apparently at a different location when viewed straight on to one of the faces of the arm.

The arm 10 further comprises a plurality of attachment elements 14. In this example, two attachment elements 14 are provided on the arm 10, with each of the attachment elements 14 positioned at an opposing end of the arm 10. Whilst the example shows the attachment elements 14 near the lateral sides of the arm 10, in other examples the attachment elements 14 can be positioned near the longitudinal sides of the arm 10.

Each attachment element 14 is arranged, in use, to attach the arm 10 to the base plate 20. In this example, each attachment element 14 comprises two bores 15. The bores 15 are arranged to receive and engage a securing element 19 for securing the arm 10 directly or indirectly to the base plate 20. Examples of securing elements 19 include screws, rails, pins, or any combination of these. The bores 15 in the example shown are through-bores, and comprise a threaded surface. The threaded surface of each bore 15 is arranged, in use, to cooperate and engage with a complementary threaded surface on a securing element 19. Of course, depending on the choice of the securing element 19, other examples of the arm 10 may comprise blind bores or non-threaded bores. As well as having the threaded surface, the bores have a counter-sunk portion. As is set out in more detail below, this is configured to cooperate with a securing element. Each of the attachment elements 14 are symmetrically positioned on the arm 10.

The pair of bores 15 within each attachment element 14 are joined by a slot 17. Each slot 17 extends between the two bores 15 in each attachment element 14 to provide a continuous through-bore linking the two bores 15. The slots 17 can be used to provide additional functionalities, such as a hooking point for a strap or other accessories.

It will be noted that, as in the example shown, through-bores can act as attachment elements 14 on both faces of the arm 10. The bores 15 may be threaded from both a front and a rear face, to provide attachment elements 14 at corresponding positions on both faces. A securing element 19 may engage each of the through-bores 15 from either face of the arm 10.

The arm 10 further comprises an engagement means 16, arranged in use to cooperate and engage with a corresponding member of a support. By "support" we intend to mean tripod, monopod, ball head joint or any other means for attaching a bracket or mounting plate to a tripod or monopod. The engagement means 16 comprises a pair of grooves on the opposing longitudinal sides. In this example, the grooves are dovetail grooves. By dovetail, we intend to mean that at least a portion of the cross-section has a triangular shape. The grooves can be used to co-operate with a rail or jaw having a complementary shape, to form a "dovetail joint". In particular, the arm can be secured on a support by clamping the groove in a jaw member on the support. The support may comprise a "Quick-Release (QR)" mechanism to facilitate rapid attachment and detachment of the engagement means to the support. The grooves in this example are intended to be compatible with an Arca-Swiss quick release system.

An important feature of the arm 10 is that the grooves of the engagement means 19 are symmetric about the longitudinal centre of the groove. In other words, the "double-sided dovetail" grooves can cooperate with a jaw of a corresponding member on a support when the arm 10 has been rotated about its longitudinal axis. This allows the arm 10 to be attached to the base plate 20 in any one of the configurations shown in FIGS. 2A to 2D with either face being closer to the support than the other face.

Turning now to the base plate 20, an upper surface and a lower surface are provided on the base plate 20. In the example shown, the base plate 20 is arranged to receive a device on the upper surface.

The base plate 20 comprises a connector 21 for removably connecting, in use, a device to the base plate 20. The connector 21 comprises a connector bore 22 and a securing element 23. The securing element 23 comprises a threaded bolt and is arranged to co-operate, through the connector bore 22, with a threaded surface on a device, to secure the base plate 20 and the device together. For reference, there are two standard thread sizes that are used for photographic equipment: a ⅜ inch (9.525 mm) thread, and a ¼ inch (6.350 mm) thread. The threaded bolt shown in FIG. 1 comprises a ¼ inch (6.350 mm) thread, to ensure universal connection with photographic equipment. In this example, the connector bores 22 are threaded at the same diameter as the bores 15 of the arm 10. This allows, for example, a device to be mounted at either one of the connector 21 of the base plate 20 or the attachment means 14 of the arm 10.

As shown in the figures, the base plate 20 may be provided with a plurality of connector bores 22. This provides the user with greater flexibility as to the position at which a device may be mounted to the base plate 20. For example, the connector bore 22 to be used may be chosen depending on the dimensions of the device being secured to the base plate 20.

As described above, the upper surface of base plate 20 is arranged to receive and secure a device to the base plate 20. In order to ensure a safe and durable interface between the device and the base plate 20, the upper surface of the base plate 20 is provided with gripping pads 28. In the example shown, a plurality of gripping pads 28 are provided and are distributed across a significant area of the upper surface. In other examples, a single pad 28 may be provided on the upper surface. The gripping pads reduce the likelihood of device slip, and also act as a cushion to provide a soft interface between the device and the base plate 20.

The base plate 20 further comprises an engagement means 26, arranged in use to co-operate and engage with a corresponding member of a support. As with the engagement means 16 on the arm, the engagement means 26 of the base plate 20 comprises a pair of dovetail grooves on opposing longitudinal sides. In this case, by dovetail, we intend to mean that at least a portion of the cross-section has a trapezoidal shape.

The grooves can be used to co-operate with a rail or jaw having a complementary shape, to form a "dovetail joint". In particular, the base plate 20 can be secured on a support by clamping the groove in a jaw member on the support. The support may comprise a QR mechanism to facilitate rapid attachment and detachment of the engagement means to the support. Again, this is intended to be compatible with an Arca-Swiss type quick release system.

Figure 3:
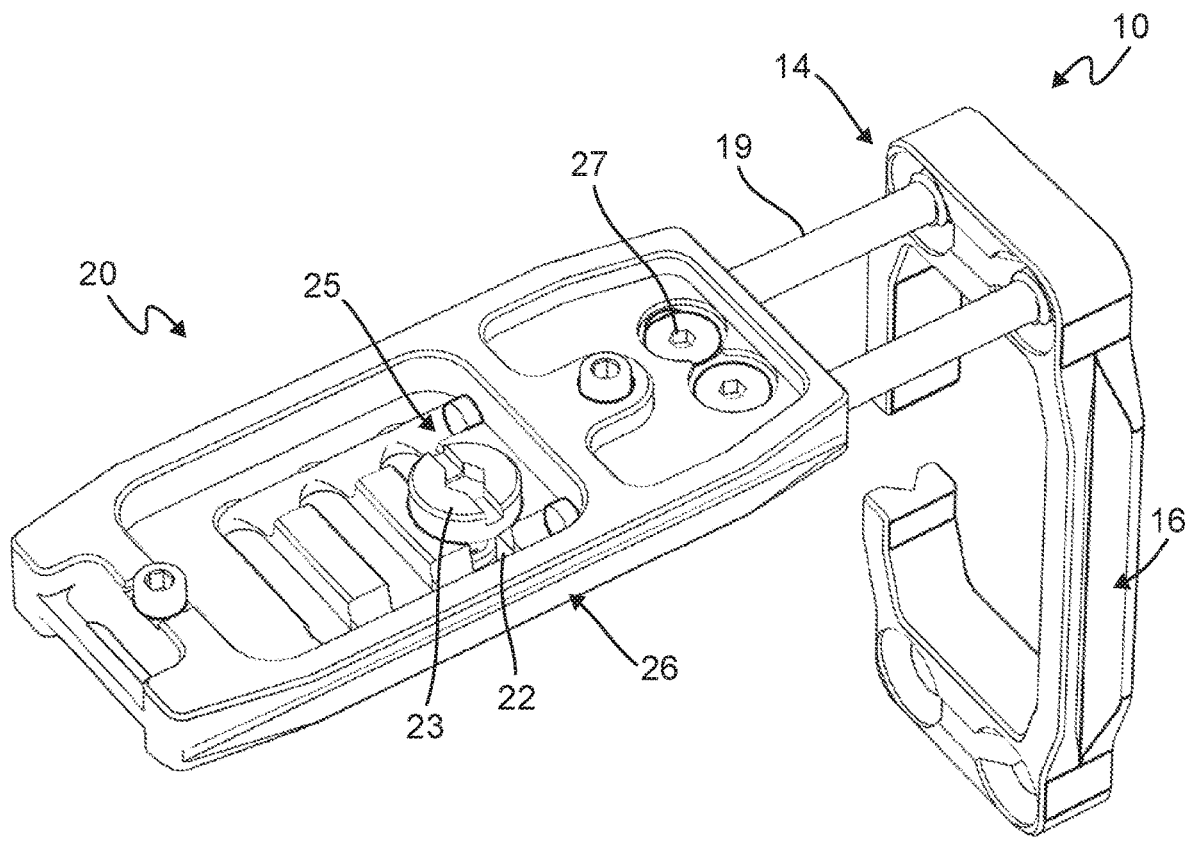
FIG. 3 schematically illustrates a detail view of a portion of the example L-bracket of FIG. 1.

The mounting assembly of FIG. 1 shows the arm 10 and the base plate 20 being connected via a securing element 19. A detailed view of the connection is shown in FIG. 3.

In the example shown, which is viewed from below the assembly in FIG. 3, the base plate 20 comprises two bores 24 each arranged to engage with a securing element 19 to secure the base plate 20 to the attachment means 14 of the arm 10. The base plate 20 further comprises recesses 25 adjacent to the bores 24. The recesses are arranged to receive and guide the securing element 19, and to allow a smooth slidable engagement between the base plate 20 and the securing element 19.

In the assembled configuration, the arm 10 is secured to the base plate 20 by a securing element 19. The securing element 19 engages an attachment means 14 of an arm at one end and a bore 24 of the base plate 20 at the other end. A user can select a desired configuration of the arm 10 (from the configurations shown in FIGS. 2A to 2D), and connect the securing element 19 to the attachment means 14 of the arm 10. The securing element 19 can then be inserted in the bores 24 of the base plate 20 to complete the connection between arm 10 and base plate 20.

In this example the securing element 19 is provided by a rail, a pair of which are used to connect the arm and base plate as set out above. The rails have a cylindrical pole section engagable with the bores 24 of the base plate 20 and a treaded end portion engagable with the arm. The end potion of each rail also has a tapered portion that has a complimentary shape to the counter-sunk portion of the attachment elements 14 of the arm 10. This allows the end of the rail to be flush with a face of the arm when the arm is mounted to the base plate.

The base plate 20 shown in FIG. 3 further comprises two locking members 27. Each of the locking members 27 are arranged to lock the position of a securing element 19 in the bore 24 and recess 25 of the base plate 20. The locking members 27 comprise locking screws whose axis of insertion into the base plate 20 intersects the axis of motion of the securing element 19 in the bore 24. The locking screws can be tightened to exert a force on the securing element 19 so as to engage and hold the securing element 19 in position. In this way, once a desired orientation of the arm 10 and base plate 20 has been achieved, a user can lock the parts together and ensure that the mounting assembly 1 holds its configuration.

As can be seen in FIG. 3, the lower surface of the base plate 20 can comprise raised portions or areas of raised surface. The raised surface can be arranged to interact with a complementary portion of an external component.

Once assembled, the mounting assembly 1 can be used to mount a device to a support, by connecting a device to the connector 21 (or one of the attachment means 14) and then engaging the mounting assembly 1 to a support via one of the engagement means 16 or 26.

Due to the aperture 12 in the arm, the mounting assembly 1 provides a user with significant access to the device even when the device is in use on the assembly 1. Advantageously, the arm 10 can be configured, using one of the orientations shown in FIGS. 2A to 2D, to position the opening 13 to provide still further access to the device when in use. The ability to move the position of the opening 13 provides significant versatility to the mounting assembly 1, which can be adjusted and configured for use with a large number of devices. A particular advantage of the opening 13 is that it allows the user to connect to the side of the device cables having right-angled connectors.

Figure 4A:
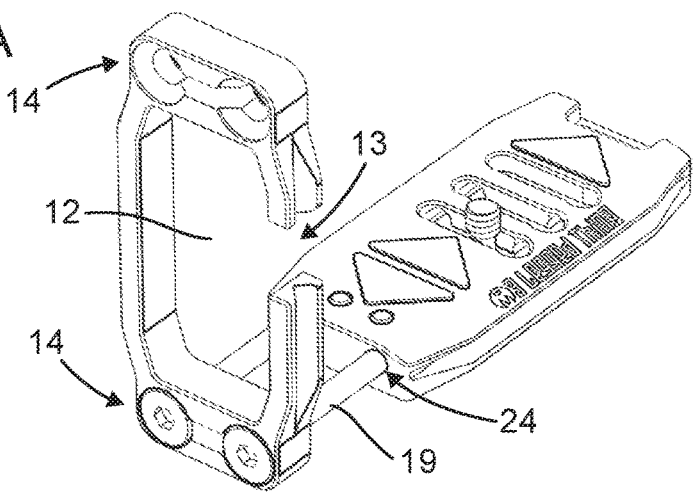
FIG. 4A schematically illustrates an example configuration of the L-bracket of FIG. 1.
Figure 4B:
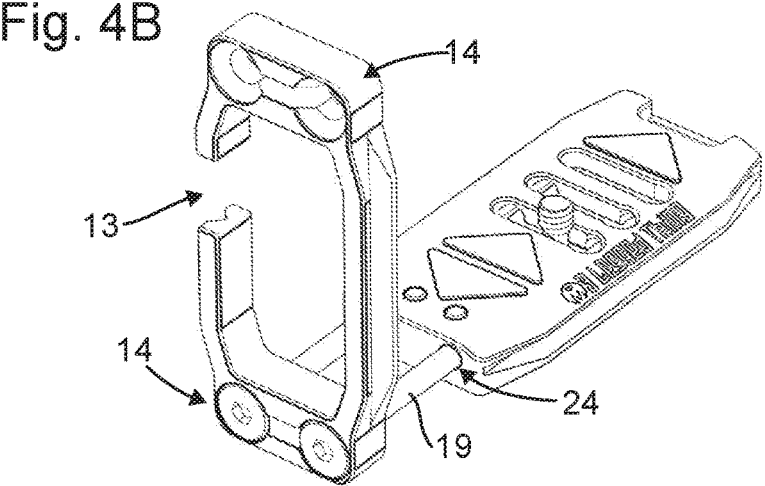
FIG. 4B schematically illustrates another example configuration of the L-bracket of FIG. 1.
Figure 4C:
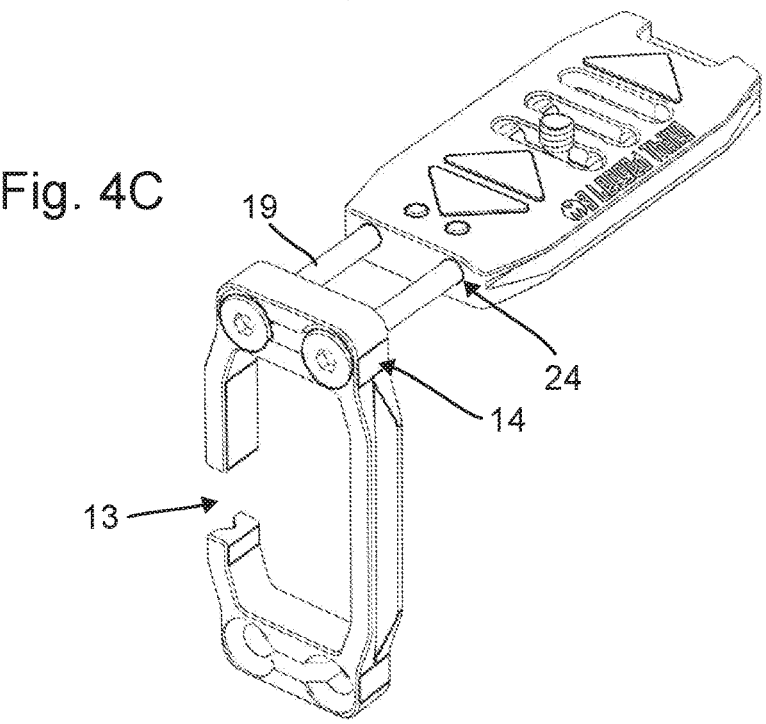
FIG. 4C schematically illustrates another example configuration of the L-bracket of FIG. 1.

Some example configurations of the mounting assembly 1 have been illustrated in FIGS. 4A to 4C. FIGS. 4A and 4B illustrate example configurations of the mounting assembly 1 in which the orientation of the arm 10 has been rotated by 180 degrees about its longitudinal axis. A user may effect a transition between the two configurations of FIGS. 4A and 4B by disengaging the securing element 19 from the base plate 20 and the arm 10, rotating the arm 180 degrees through its longitudinal axis and reengaging the securing means to both the base plate 20 and the arm 10.

It can be seen that, by attaching the arm 10 to the base plate 20 at the different attachment elements, the apparent position of the opening 13 with respect to the base plate 20 can be reconfigured. In other words, the distance from the opening 13 to the base plate 20 is different when the arm 10 is connected to the base plate 20 by each respective attachment element 14.

FIG. 4C shows an alternative arrangement with the arm 10 extending downwardly from the base plate instead or upwardly as in FIGS. 4A and 4B. This is achieved by the manner in which the securing element 19 and arm are arranged relative to the base plate. This allows the arm to be used as a handle or as an alternative support means when the device mountable to the base plate is wanted in a different position.

In order to facilitate the use of device accessories such as a camera flip screen, the upper surface of the base plate 20 has a chamfered edge along a longitudinal side (i.e. the side on which the engagement elements are located). This provides an angled surface to allow a user to insert their figures between the base plate and the device to a sufficient extend to release the flip screen.

Figure 5:
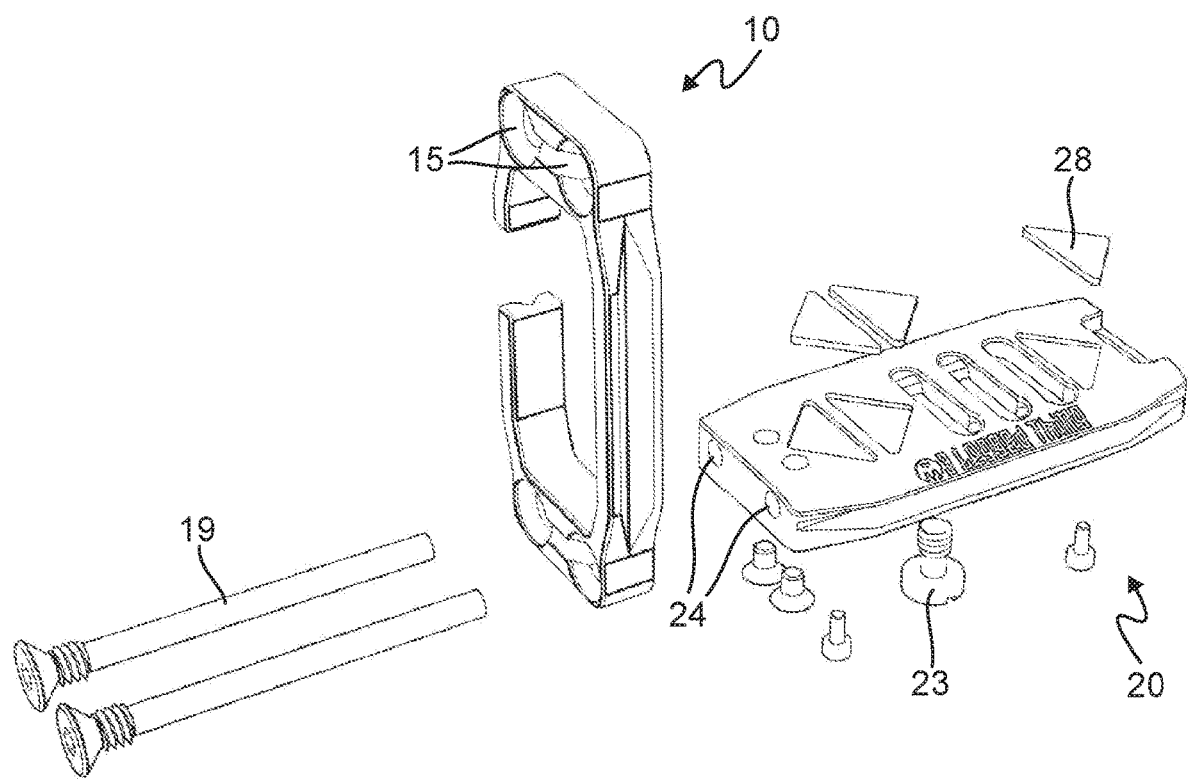
FIG. 5 schematically illustrates the example L-bracket of FIG. 1 in an unassembled configuration.

The mounting assembly 1 can be seen in FIG. 5 in an unassembled configuration. It can be seen from FIG. 5 that the mounting assembly 1 can easily be assembled from a kit consisting mainly of the arm 10 and the base plate 20. It can also be seen that the orientation of the arm 10, and thus the position of the opening 13, can easily be configured by removing the securing element 19, adjusting the arm 10 with respect to the base plate 20, and re-engaging the securing element 19.

A further example L-bracket 100 is shown in FIGS. 6 to 10. This uses a number of the same components as the example L-bracket shown in FIGS. 1 to 5. Indeed, the arm 10 is identical to the arm shown in the example illustrated in FIGS. 1 to 5 and is able to be varied in the same manner as set out above. As such, as is most clearly shown in FIGS. 7A and 7B, the arm comprises a plate 11 having an aperture 12 therethrough. The aperture is provided on the arm so as to form an opening 13 in a side, such that the arm is substantially C-shaped.

Figure 7A:
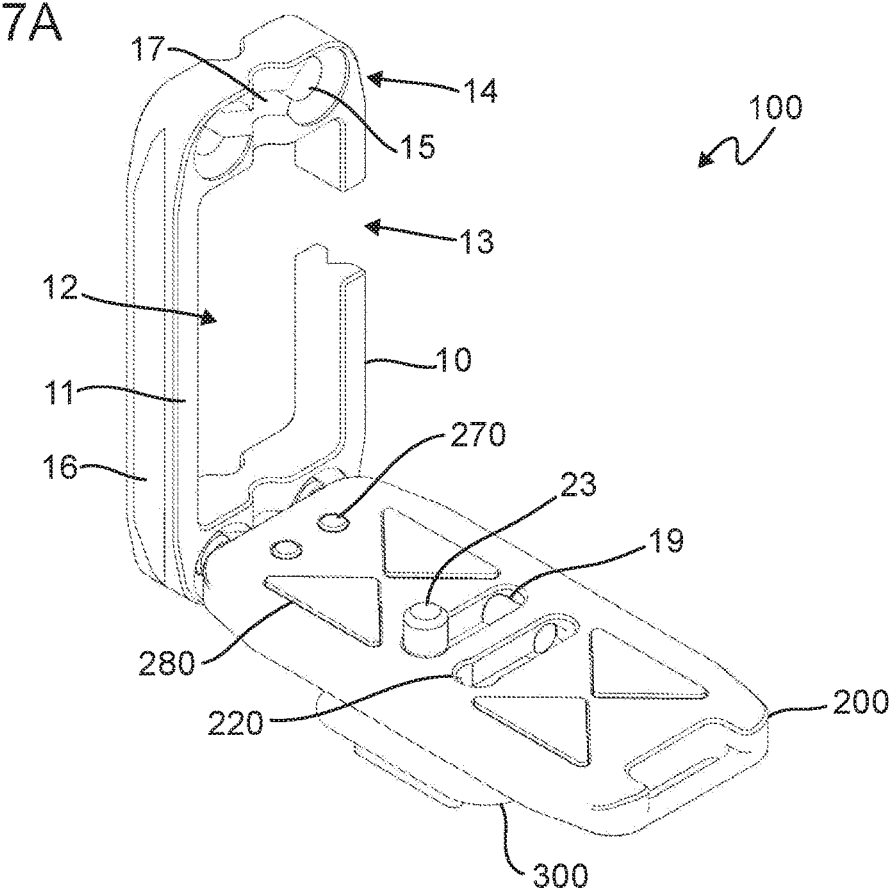
FIG. 7A schematically illustrates the further example L-bracket in a first configuration.
Figure 7B:
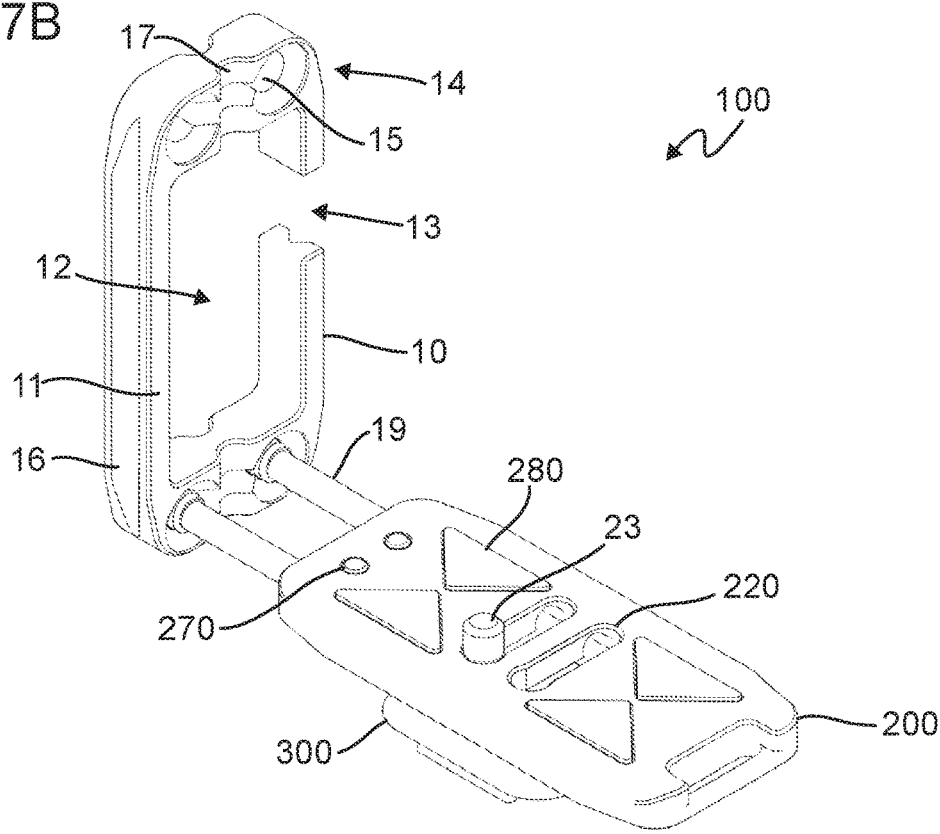
FIG. 7B schematically illustrates the further example L-bracket in a second configuration.

In the example shown in FIGS. 7A and 7B, the arm 10 has two pairs of opposing sides: two opposing longitudinal sides, and two opposing lateral sides, the longitudinal sides being longer than the lateral sides. This forms a generally rectangular shape. The opening 13 is provided on one of the longitudinal sides, at a position closer to one of the two lateral sides than the other lateral side.

In addition to the two pairs of opposing sides, the arm 10 has two faces. These are separated by the sides of the arm, which provide the arm with its thickness.

The arm 10 further comprises a plurality of attachment elements 14. There are two attachment elements provided on the arm, with each of the attachment elements positioned at an opposing end of the arm. Whilst the example shows the attachment elements near the lateral sides of the arm, in other examples the attachment elements can be positioned near the longitudinal sides of the arm.

Each attachment element 14 is arranged, in use, to attach the arm 10 to the base 200. In this example, each attachment element comprises two bores. The bores are arranged to receive and engage a securing element 19 for securing the arm 1 directly or indirectly to a base.

The pair of bores 15 within each attachment element 14 are joined by a slot 17. Each slot extends between the two bores in each attachment element to provide a continuous through-bore linking the two bores. The slots can be used to provide additional functionalities, such as a hooking point for a strap or other accessories.

It will be noted that, as in the example shown above in relation to FIGS. 1 to 5, through-bores can act as attachment elements 14 on both faces of the arm 10. The bores 15 may be threaded from both a front and a rear face, to provide attachment elements at corresponding positions on both faces. A securing element 19 may engage each of the through-bores from either face of the arm.

The arm 10 further comprises an engagement means 16, arranged in use to cooperate and engage with a corresponding member of a support, such as a clamp on a tripod, ballhead or other such tripod head. The engagement means comprises a pair of grooves on the opposing longitudinal sides. In this example, the grooves are dovetail grooves. An important feature of the arm is that the grooves of the engagement means 19 are symmetric about the longitudinal centre of the groove.

In other examples, the arm may be a simple plate able to be attached to the base 200 by any suitable means, such as by a screw, rail or pin, or be formed as a single unitary piece with the base. Additionally or alternatively, the arm may not have apertures and/or bores as set out above and may simply have grooves for connection to a clamp, such as an Arca-Swiss style clamp, or another suitable form of clamp.

Returning to FIG. 6, this shows the L-bracket 100 of this example also has a base 200. This has a number of similar features to the base 20 of the example L-bracket 1 of FIGS.

1 to 5. The main difference is that the base of this example has a dockable connector 300 instead of the grooves 26 of the example L-bracket shown in FIGS. 1 to 5. More detail regarding the dockable connector is provided below.

Figure 8:
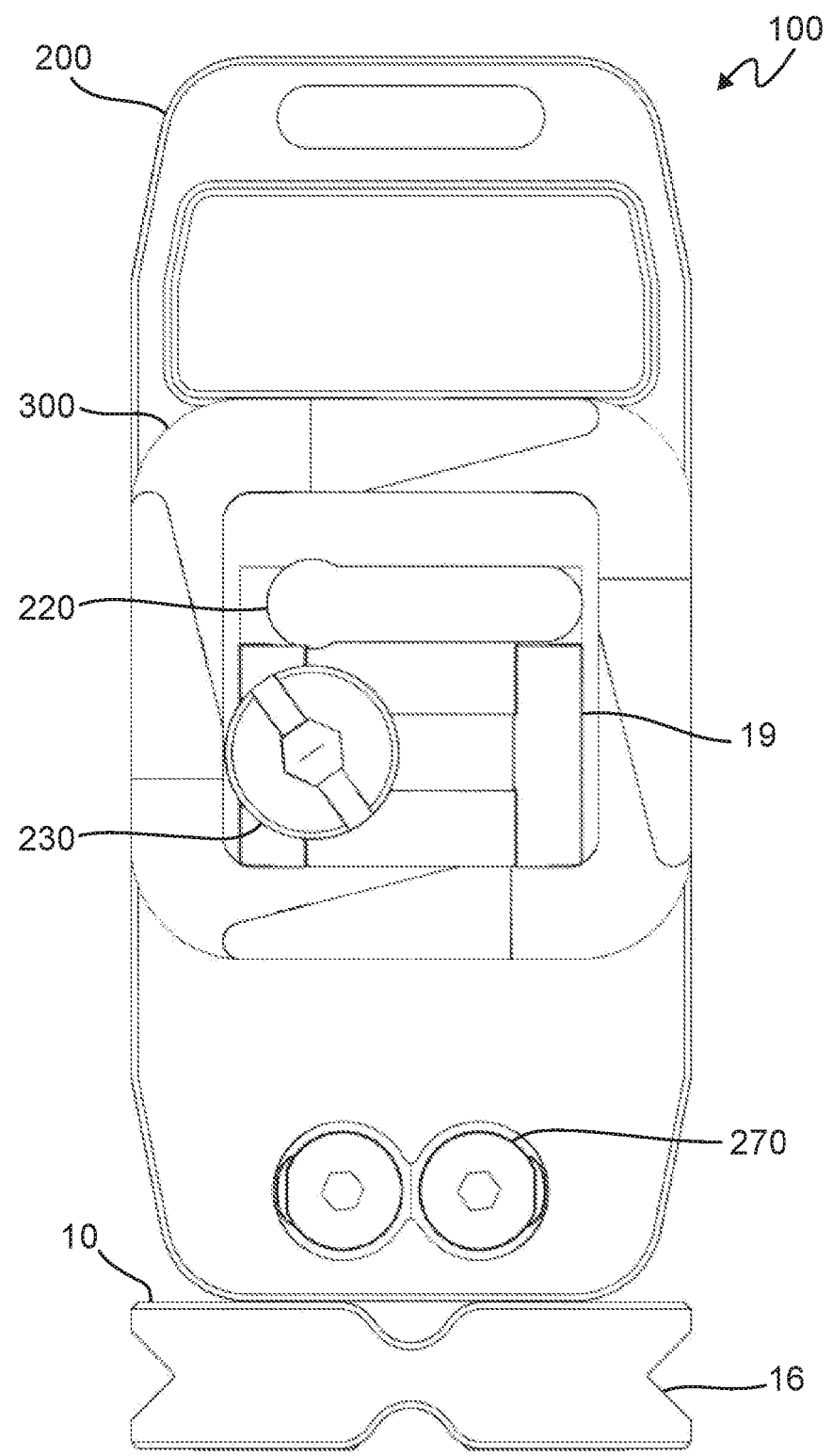
FIG. 8 schematically illustrates an underside of the further example L-bracket.

The base 200 of the L-bracket 100 shown in FIGS. 6 to 8 comprises a plate with an upper surface and a lower surface. In the example shown, the base is arranged to receive a device, such as a camera on the upper surface.

The base 200 comprises a fastening element 210 for removably connecting, in use, a device to the base. The fastening element comprises a fastening bore 220 and a securing element 23. The securing element comprises a threaded bolt and is arranged to co-operate, through the fastening bore, with a threaded surface on a device, to secure the base and the device together. This uses the standard thread sizes used for photographic equipment set out above in relation to FIGS. 1 to 5 to achieve the same result.

As shown in FIGS. 6, 7A, 7B and 8, the base 200 is provided with a plurality of fastening bores 220. These are provided for the same reason as the corresponding bores of the example shown in FIGS. 1 to 5.

As described above, the upper surface of base 200 is arranged to receive and secure a device to the base. The upper surface of the base is provided with gripping pads 280. In the example shown, a plurality of gripping pads are provided and are distributed across a significant area of the upper surface. In other examples, a single pad may be provided on the upper surface. The gripping pads are used for the same reasons as set out above in relation to the example shown in FIGS. 1 to 5.

The example L-bracket of FIGS. 6, 7A, 7B and 8 shows the arm 10 and the base plate 200 connected via a securing element 19. These are connected in the same manner as set out above in relation to FIG. 3. As such, in the example shown in FIGS. 6, 7A, 7B and 8, the base 200 comprises two bores, each arranged to engage with a securing element to secure the base to the attachment means 14 of the arm 10. This is the same arrangement as used in the example L-bracket 1 of FIGS. 1 to 5.

The base 200 further comprises recesses adjacent to the bores. The recesses are arranged to receive and guide the securing element, and to allow a smooth slidable engagement between the base and the securing element.

When assembled, the arm 10 is secured to the base 200 by a securing element 19. The securing element 19 engages an attachment means 14 of an arm at one end and a bore of the base at the other end. A user can select a desired configuration of the arm 10 (in the same way as set out above in relation to FIGS. 2A to 2D), and connect the securing element to the attachment means of the arm. The securing element can then be inserted in the bores of the base to complete the connection between arm and base.

In this example the securing element 19 is provided by a rail, a pair of which are used to connect the arm and base plate as set out above. The rails have a cylindrical pole section engagable with the bores of the base 200 and a treaded end portion engagable with the arm 10. The end potion of each rail also has a tapered portion that has a complimentary shape to a counter-sunk portion of the attachment elements 14 of the arm to allow the end of the rail to be flush with a face of the arm.

The base 200 further comprises two locking members 270. These are most clearly shown in FIG. 8. Each of the locking members are arranged to lock the position of a securing element 19 in the bore and recess of the base. The locking members comprise locking screws whose axis of insertion into the base intersects the axis of motion of the securing element in the bore. The locking screws can be tightened to exert a force on the securing element so as to engage and hold the securing element in position. In this way, once a desired orientation of the arm 10 and base has been achieved, a user can lock the parts together and ensure that the L-bracket 100 holds its configuration. Two example configurations are shown in FIGS. 7A and 7B. In FIG. 7A the arm is abutting the base with the securing element holding the arm and base in this abutting configuration. In FIG. 7B the arm is separated from the base with the securing element locked in position by the locking screws, thereby holding the arm in this separated position relative to the base.

In order to facilitate the use of device accessories such as a camera flip screen, the upper surface of the base 200 has a chamfered edge corresponding to the chamfered edge of the example L-bracket shown in FIGS. 1 to 5.

Turning to the dockable connector 300, as shown in FIG. 6, this is attached to the lower surface of the base 200. In this example the connector provides a foot that projects downwardly away from the lower surface of the base. Although alternatives are possible, in this example the projection of the foot is along an axis normal to the lower surface and extending away from the base. The footprint of the connector is generally square as shown in FIG. 8.

As shown in FIG. 6, connector 300 is made up of three sections along its length (i.e. between where the connector attaches to the base 200 of the L-bracket 100 and end of the connector furthest from the base). At the end of the connector furthest from the base there is a sole section 310. This is the shortest section of the foot in terms of length and provides a base to the connector. The outer perimeter of the sole section is upright so that it is parallel with the normal to the lower surface of the L-bracket base and with the length of the section.

An ankle portion 320 is provided at the attachment of the connector 300 to the L-bracket base 100. This section has a narrower width than the sole section and a slightly larger length. Additionally, this section has an outer perimeter that is parallel to the normal of the lower surface of the L-bracket base and the length of the section.

The final portion of the connector 300, which joins the sole section 310 to the ankle section 320 is a tapered section 330. The tapered section provides a chamfer to transition the width of the connector between the width of the sole section and the width of the ankle section. Accordingly, the outer perimeter of the tapered section is inclined relative to the normal axis of the L-bracket base 100 lower surface.

The chamfer of the tapered section 330 provides a straight inclined surface without any convex or concave sections. This gives the tapered section a smooth, featureless surface.

The height of the tapered section 330 relative to the height of the other sections is approximately the same as the height of the sole section 310 and ankle section 330 combined. The sole section has a height of about a third of the height of the tapered section and the ankle section has a height of about two thirds of height of the tapered section.

Figure 9:
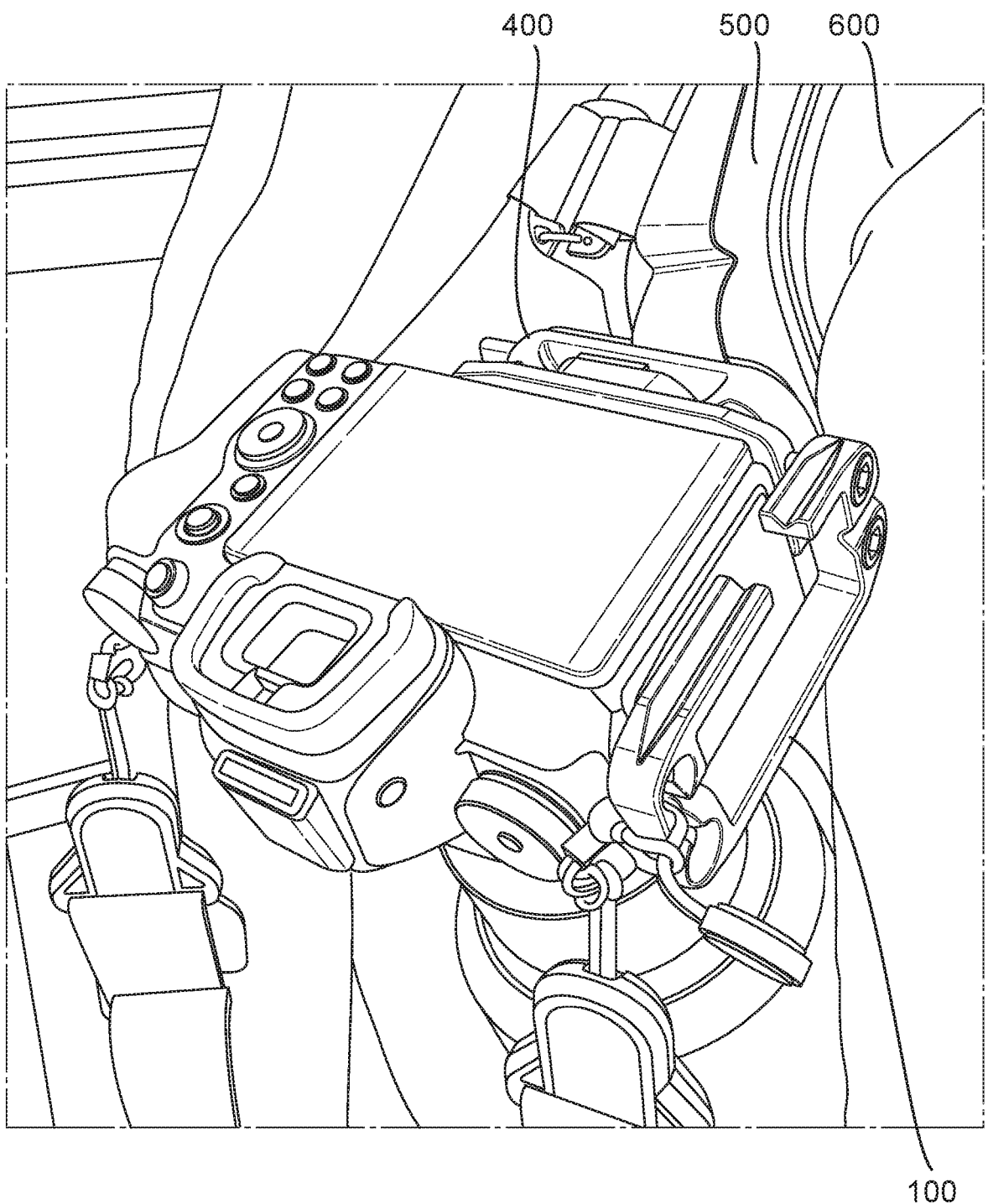
FIG. 9 illustrates the further example L-bracket in a docked configuration.
Figure 10:
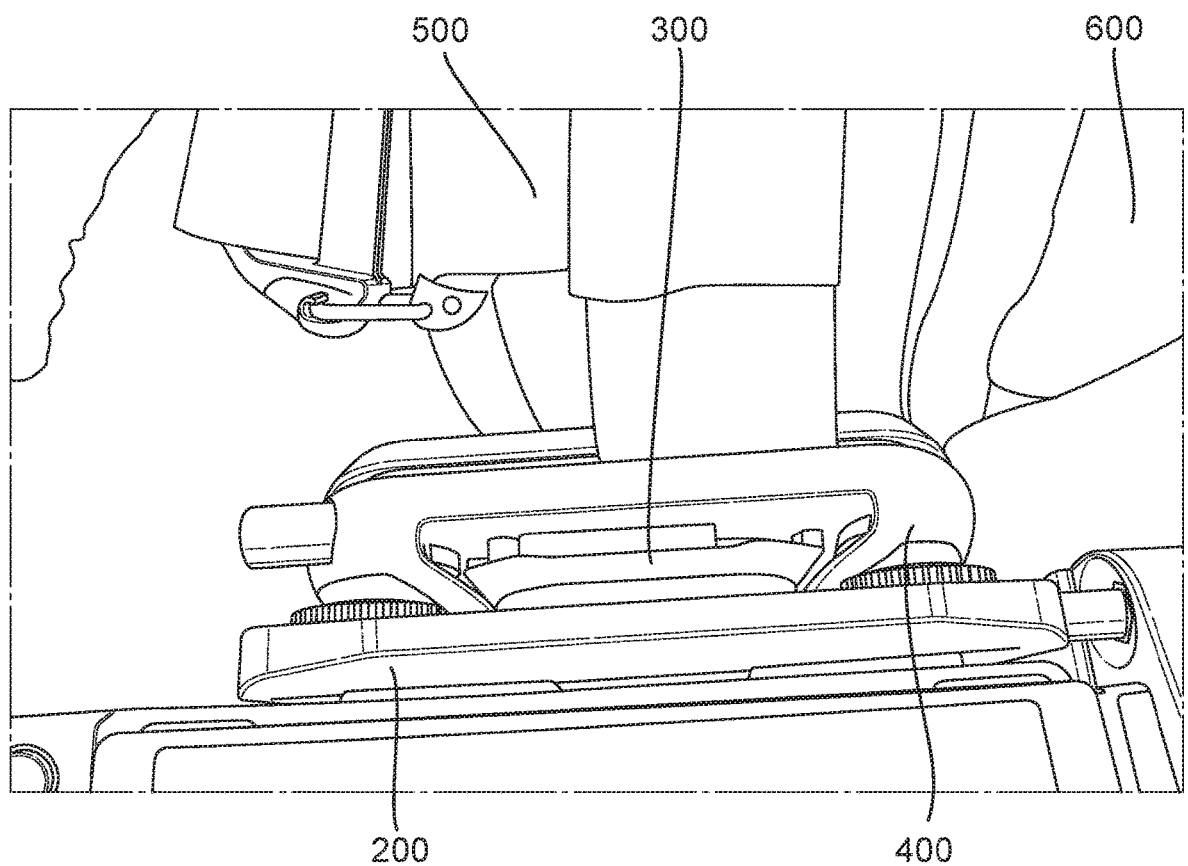
FIG. 10 also illustrates the further example L-bracket in a docked configuration.

As shown in FIG. 9 and FIG. 10, the shape of the connector 300 allows the connector to removably dock with a docking clip 400 on a strap 500 worn on the body of a user 600. This is due to the complementary shapes of the connector and an aperture in the clip.

Due to the square footprint of the connector 300, the L-bracket is able to be docked with the clip 400 in multiple orientations. For example, as can be seen from FIG. 9, the clip has a width generally aligned across the body of the user. This width is greater than the height of the clip, which is generally aligned with the height of the user. As shown in FIG. 9 and FIG. 10, with the connector docked with the clip, the length of the base 200 is generally aligned with the width of the clip. It is also possible for the length of the base 200 to be aligned with the height of the clip by removing the connector from the dock, rotating the L-bracket by 90 degrees about an axis perpendicular to the width and length of the clip and re-docking the connector with the clip. Accordingly, the L-bracket may be docked with the clip in up to four orientations, each provided by a 90 degree rotation relative to this axis.

In the example shown in FIGS. 6 to 10, the connector 300 is able to be docked with a Peak Design Capture Clip. In alternative examples, the connector is able to be docked with an alternative holster style clip. For example, the connector of this example is able to be replaced with a connector in the form of a pillar projecting outwardly and downwardly from the lower surface of the base 200 of the L-bracket 100. This pillar has a narrow waist section between an end potion and a join to the L-bracket base, the end section being generally spherical in shape with a wider diameter than the diameter of the waist. Such a connector would provide an ability to connect the L-bracket in multiple orientations to a Spider Camera Holster. When this alternative example is used, the L-bracket base may have the dovetail grooves present in the example L-bracket shown in FIGS. 1 to 5. These grooves provide an engagement means for engagement with a support, and alternatives to the grooves may also be used.

As noted above, the connector 300 shown in FIGS. 6 to 10 has a generally square footprint, and each of the four sides of the connector 300 is provided with a sole section 310, an ankle section 320 and a tapered section 330 as described above. That is, each side of the square connector 300 comprises a straight ankle section 320 extending from the attachment of the connector 300 to the L-bracket base 100, a chamfered edge constituting the tapered section 330, which in various examples projects outward from the ankle section at an inclined angle to the sides of the ankle section, and a straight sole section 310. This arrangement results in the connector 300 having a cross-section having two pairs of opposing sides which are complimentary and which can both be used to dock the connector 300 to a clip 400. Each pair of sides allows the connector to dock in at least two orientations. In other words, the cross-section of the connector 300 has four lines of symmetry. The connector 300 can therefore be docked to the clip 400 in four different orientations.

The connector 300 has been described above as having a generally square footprint. Whilst a perfect square has two opposing sides of equal length, if one of the two opposing pairs of sides has a length which is slightly longer than the other pair, the footprint has two lines of symmetry and therefore the connector can be docked in two different orientations. As such, by 'generally square', we intend to mean that the connector has a cross section with at least two lines of symmetry, preferably with four lines of symmetry for a perfect square.

It will be appreciated that the shape of the cross-sectional footprint of the connector 300 (and the resulting lines of symmetry of the footprint) can determine the ability of the connector 300 to dock to the clip 400 in multiple orientations. In examples other than the one illustrated in FIGS. 6 to 10, the connector 300 can be provided with a different shape having a different number of lines of symmetry. For example, a hexagonal footprint provides three pairs of straight/chamfered edges which can each be used to dock the connector in at least two orientations. Such an example would therefore result in a connector 300 which can be docked to a clip 400 in six different orientations.

The shape of the connector 300 of the example shown in FIGS. 6 to 10 allows the connector to also be attached to an Arca-Swiss style connector, such as those common on a clamp of a tripod head. This allows the base 200 to retain the ability to connect to a clamp, such as a clamp of a tripod head while still allowing it to dock with a clip 400. In order to achieve a suitable ability for a user to use the L-bracket of this example, the connector is attached to the base 200 approximately half way along the length of the base.

Additionally, in this example the fastening bores 220 of the base are located within the footprint of the connector, as shown in FIG. 8. Since cameras generally have a bore for accepting an attachment to an accessory in the middle of the base of the camera, this relative position of the fastening bores and the connector, and the connector and the base allow suitable positioning of the camera relative to the L-bracket 100.

In other examples the connector 300 may be attached to the arm 10 instead of to the base 200. Whichever configuration is used, the connector may be formed as a single unitary piece with the base or arm, may be a separable component or may be removable or non-removably fixed (such as by welding) to the base or arm.

The invention claimed is:

1. An L-bracket for a camera, comprising:
a base, an upright arm connected to the base and a fastening element arranged in use to provide a releasable connection between the camera and the L-bracket; and
a connector attached to and extending from one of the base or the arm, the connector being arranged in use to engage a dock mountable on a strap, the connector having a sole section with a diameter and a tapered section with surfaces shaped to engage the dock, wherein the connector has a cross-section having at least two lines of symmetry to allow the connector to engage the dock in multiple orientations.

2. The L-bracket according to claim 1, wherein the surfaces are defined by at least two sides shaped to engage the dock.

3. The L-bracket according to claim 1, wherein the connector is shaped to engage the dock in three or more orientations.

4. The L-bracket according to claim 1, wherein the orientation of the connector is fixed relative to the base when attached to the base or to the arm when connected to the arm.

5. The L-bracket according to claim 1, wherein the connector has a fixed location relative to the base when attached to the base or to the arm when attached to the arm.

6. The L-bracket according to claim 1, wherein the position of the fastening element is moveable relative to the location of connector.

7. The L-bracket according to claim 1, wherein the fastening element is engagable with the base and with a camera to provide the connection between the camera and the L-bracket in use.

8. The L-bracket according to claim 1, further comprising a first securing element, the first securing element providing a connection between the arm and the base.

9. The L-bracket according to claim 8, wherein the base comprises one or more bores each arranged, in use, to engage with the first securing element.

10. The L-bracket according to claim 8, wherein the first securing element is moveable to allow the distance between the arm and the base to be adjusted in use.

11. the L-bracket according to claim 8, wherein the base further comprises a locking member to lock the first securing element in position.

12. The L-bracket according to claim 8, wherein the first securing element comprises a rail.

13. The L-bracket according to claim 1, wherein the arm is a plate having a C-shape provided by an aperture in the plate, the arm thereby having an opening in a side and the arm having a plurality of attachment elements arranged, in use, to attach the arm to the base plate, the position of the opening in the arm causing the opening to have a different position relative to the base plate when the arm is connected to the base plate by each respective attachment element.

14. The L-bracket according to claim 13, wherein the arm has opposing ends, the opening being between the opposing ends, and each end having at least one attachment element.

15. The L-bracket according to claim 7, wherein the arm is a plate having a C-shape provided by an aperture in the plate, the arm thereby having an opening in a side, and each attachment element comprises one or more bores, and each of the bores is arranged, in use, to engage the first securing element engagable with the base plate, and optionally wherein at least a portion of the first securing element has a threaded surface and the bores are threaded bores, and preferably the bores are through-bores.

16. The L-bracket according to claim 1, wherein the fastening element comprises a connector bore, and the connector bore is arranged, in use, to engage a second securing element.

17. the L-bracket according to claim 1, wherein the arm comprises an engagement means for engagement with a support, and optionally, wherein the engagement means comprises a pair of grooves on opposing sides of the arm, preferably the grooves of the engagement means are dovetail grooves.

18. The L-bracket according to claim 1, wherein the base comprises an upper surface and a lower surface, the upper surface arranged to receive, in use, the camera, and at least one edge of the upper surface comprises a downward chamfer.

19. A kit of parts for an L-bracket to claim 1, the kit comprising:
 a base;
 an upright arm connectable to the base;
 a fastening element arranged in use to provide a releasable connection between a camera and the L-bracket; and
 a connector attached to and extending from one of the base or the arm, the connector being arranged in use to engage a dock mountable on a strap, the connector having a sole section with a diameter and a tapered section with surfaces shaped to engage the dock, wherein the connector has a cross-section having at least two lines of symmetry to allow the connector to engage the dock in multiple orientations.

20. The L-bracket according to claim 1, wherein the orientation of the connector is fixed relative to the base or arm to which the connector is attached, the connector having an ankle portion having a diameter and located between the sole section and where the connector is attached to the base or arm, the diameter of the ankle portion being narrower than the sole section diameter, and wherein the connector is arranged in use to engage a complementarily shaped dock mountable on a strap and the sole section, tapered section, and ankle portion being shaped to allow the connector to engage the dock in multiple discrete orientations.

\* \* \* \* \*